United States Patent [19]

Perntz et al.

[11] Patent Number: 4,646,291
[45] Date of Patent: Feb. 24, 1987

[54] SYNCHRONIZATION APPARATUS IN TRANSMITTING INFORMATION ON A SIMPLEX BUS

[75] Inventors: Carl-Gunnar E. Perntz, Huddinge; Sture G. Roos, Bergshamra, both of Sweden

[73] Assignee: Telefonaktiebolaget LM Ericsson, Stockholm, Sweden

[21] Appl. No.: 574,105

[22] PCT Filed: Apr. 26, 1983

[86] PCT No.: PCT/SE83/00163
§ 371 Date: Dec. 21, 1983
§ 102(e) Date: Dec. 21, 1983

[87] PCT Pub. No.: WO83/03936
PCT Pub. Date: Nov. 10, 1983

[30] Foreign Application Priority Data

Apr. 26, 1982 [SE] Sweden ............................... 8202577

[51] Int. Cl.[4] .............................................. H04J 3/06
[52] U.S. Cl. .................................................. 370/85
[58] Field of Search ...................... 370/85, 86, 94, 100

[56] References Cited

U.S. PATENT DOCUMENTS 3,732,374 5/1973 Rocher et al. ......................... 370/85
4,498,168 2/1985 Tseng .................................... 370/86
4,503,533 3/1985 Tobagi et al. ......................... 370/94

Primary Examiner—Douglas W. Olms
Assistant Examiner—Kenneth I. Rokoff
Attorney, Agent, or Firm—Roberts, Spiecens & Cohen

[57] ABSTRACT

Synchronization apparatus in a telecommunication system of the TDM type in which information is transmitted in assigned time slots, in simplex data transmission between a plurality of equal transmitter/receiver modules (A-N) connected to a common bus. The bus is divided into three sections, all transmitters (S) being successively connected to the first section (B1) and all receivers (R) being connected to the final section (B3) in the same order as the transmitters. The time delay between transmitters and bus is the same for all transmitters and constitutes a fixed value, whereby the total delay on the first section of the bus is determined by the number of transmitters connected. The same condition applies to the receivers so that the delay on the final section (B3) of the bus also is fixed value. The intermediate section (B2) of the bus extends from the last connected transmitter to the first connected receiver, and is variable in length such that in relation to the size of said fixed time delays it gives a selectable predetermined total time delay between transmitter and receiver in the same module. Each of the modules (A-N) contains a local clock oscillator (CL) common to the respective transmitter and receiver. Apart from internal clock signals, the oscillator also sends frame synchronizing pulses (FS) for synchronizing remaining modules (slave modules) each time the module is selected as the master. The synchronization pulses are sent once per frame and parallel to the data information from respective transmitter (S). With the aid of the apparatus in accordance with the invention there is obtained a synchronization process enabling transmission of a first information between an arbitrarily selected pair of modules and a second information between another arbitrarily selected pair of modules using two adjacent time slots without time difference between the sending sequences in the repective time slot.

4 Claims, 3 Drawing Figures

SYNCHRONIZATION APPARATUS IN TRANSMITTING INFORMATION ON A SIMPLEX BUS

TECHNICAL FIELD

The invention relates to a synchronization apparatus in a telecommunication system of the time division multiple (TDM) type in which information is transmitted in assigned time slots in one-way data transmission between a plurality of equal transmitter/receiver modules connected to a common bus.

BACKGROUND ART

In order to achieve data transmission correctly in time, signals for synchronizing between transmitter and receiver must also be sent out on a bus.

In known apparatus, as for example in the LM Ericsson Company Description identified by catalogue code X/Yg 118909 Ue relating to the regional processor bus in an AXE 110 telephone exchange, separate clock equipment is utilized for the bus, which means that the information is intentionally delayed and clocked out on the bus with the aid of a separate clock signal unit.

For a combination of transmitter and receiver in the same module, in the above-indicated known apparatus there are required separate clock signals and possibly clock oscillators in both transmitters and receivers for synchronizing with respect to the bus. This results in delay in the information transmission, poor capacity utilization on the bus and a complicated hardware structure. Furthermore, it is difficult to achieve great reliability with central feeding of clock signals.

SUMMARY OF INVENTION

It is an object of the invention to provide an improved telecommunication system of the time division mutliplex type.

To achieve the above and other objects of the invention, there is provided apparatus which includes a bus which is intended for simplex information transmission connected to a plurality of modules, each module including a transmitter and a receiver. An arbitrarily selected module constitutes the master module, and sends synchronizing pulses as well as data to the other modules (slave modules). The synchronizing pulses are used to establish time slots in the TDM system.

With respect to the transmission direction, all the transmitters are successively connected to the starting section of the bus, while all receivers are connected to the final section thereof in the same order as the transmitters. This enables disposing the starting and final sections in parallel conductors in the same cable. The intermediate section of the bus, extending from the last connected transmitter to the first connected receiver is dimensioned such that the delay of information through the bus for transmission from transmitter to receiver in one and the same module, in accordance with the example below, will be at least one time slot or more. The time delay can also be less than one time slot in certain cases. Since the synchronizing pulse and the data information travel the same way, each of the slave modules is synchronized to assume a relative phase position corresponding to its position on the bus. Data is thus clocked-out in the same local clock phase irrespective of the transmitter module, and is clocked-in in the next local clock phase irrespective of receiver module. The one time slot delay through the bus allows the same clock oscillator to be utilized for both transmitter and receiver in a module. The arrangement and dimensioning of the bus enables interference transmission firstly of, information between an arbitrarily selected module pair, and secondly information between a second arbitrarily selected module pair while using two mutually adjacent time slots, and so on until all time slots are occupied.

The advantages of the apparatus provided in accordance with the invention over known apparatus include:

(1) Better bus capacity utilization is obtained by the implementation of the bus and the synchronizing method;

(2) No re-clocking unit on the bus intermediate section is necessary; and (3) Transmitter and receiver clocks are the same for the respective modules, irrespective of whether a module is a master or a slave, i.e. master and slave are alike, unified hardware thus being obtained.

DESCRIPTION OF FIGURES

The apparatus in accordance with the invention is described in detail below with reference to the appended drawing, in which.

PREFERRED EMBODIMENT

As mentioned above, a bus is divided into three sections, a first section B1 connected to the transmitter outputs of the modules, a second intermediate section B2 and a third final section B3, which is connected to the receiver inputs of the modules.

The bus is adapted for a high transmission rate, e.g. 8 MHz bus clocking frequency. If the time delay is selected as one time slot, it will be 125 ns, which is comparatively short in relation to a whole frame.

As mentioned previously, a given time delay is decided, e.g. corresponding to one time slot between the transmitter and receiver in the same module. The same time delay applies to arbitrary transmission, i.e. irrespective of what module is the transmitter and what module is the receiver, by a synchronizing pulse sent from the master module being transmitted parallel to the data signals from the respective transmitter module. Such time delay is determined by the different sections B1, B2, B3 of the bus. The sections B1 and B3 consist of parallel conductors in the same cable, and give a fixed time delay depending on the number of modules comprising both transmitter and receiver that are connected to the bus. Since the number of modules can vary, and thereby the fixed part of the time delay, the intermediate section B2 of the bus is variable and is adjustable in length so that the desired combined time delay of at least one time slot is always achieved independent by the fixed time delay in the bus sections B1 and B3.

The cable length from transmitter to bus and from bus to receiver is also predetermined. The bus may be a cable bus with cable contacts as connection means.

Figure 1:
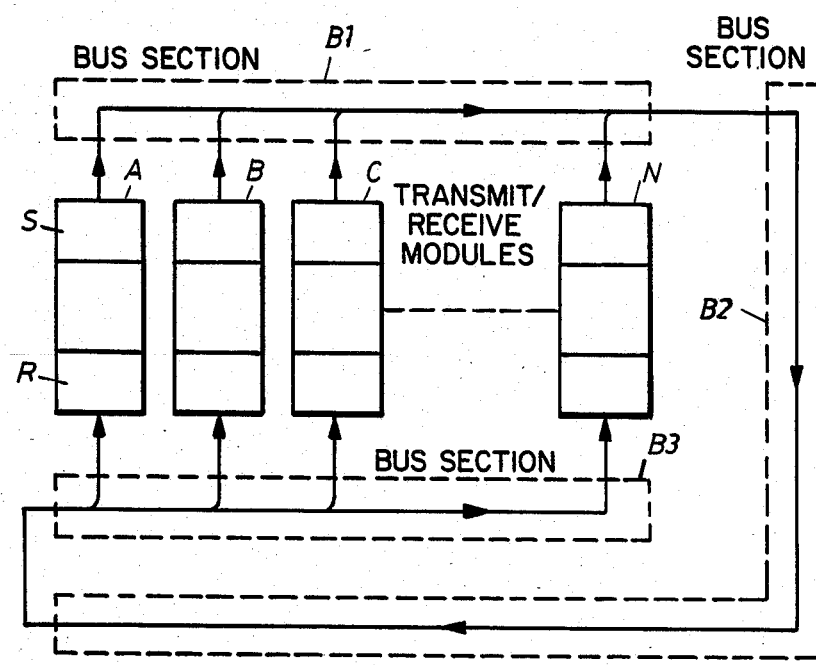
FIG. 1 is a simplified block diagram of an apparatus provided in accordance with the invention.

As will be seen from FIG. 1, a number of modules A-N are connected to a common bus, each module containing a transmitter S and a receiver R. The bus is divided into three sections, a first section B1 at the start of the bus to which all transmitters S are connected, a second section B2 consisting of the intermediate section of the bus, and a third section B2 which is the final section to which all receivers R are connected. The transmitters are connected to the bus in a definite order and the receivers are connected to the bus in this same order.

In order to achieve the object of the invention, namely the provision of a synchronization method allowing exchange of information between arbitrary transmitters and receivers in adjacent time slots without play in time, the apparatus provided in accordance with the invention also includes equipment in the modules A-N, apart from such bus arrangement.

Figure 2:
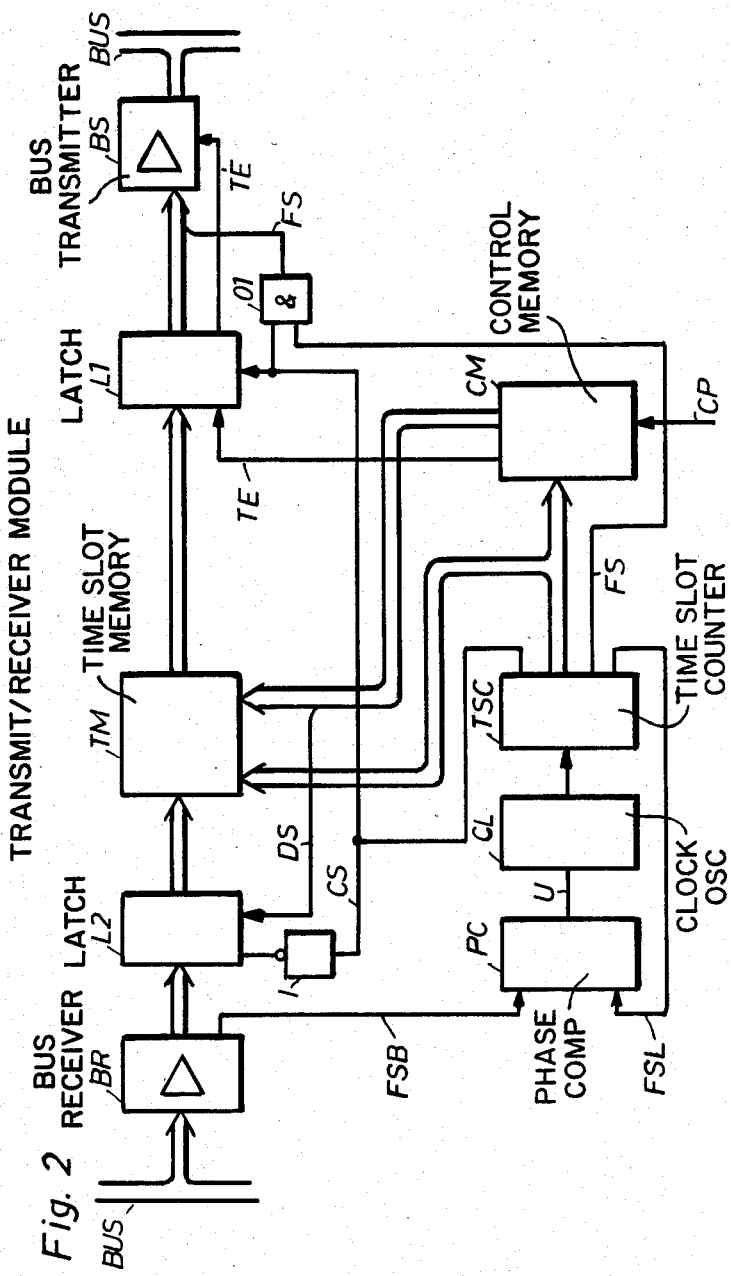
FIG. 2 is a block diagram of the transmitter/receiver equipment included in each respective module.

As will be seen from FIG. 2, each module A-N includes a time slot memory TM of the INTEL 2148 type, in which data from and to the bus is respectively read in and read out under control by signals from a continuously stepping time slot counter TSC of the type 74LD161 and a control memory CM of the type INTEL 2148. The time slot counter is controlled by a local clock oscillator CL of the type MOTOROLA MC 4024, associated with the module and common to transmitter and receiver the oscillator CL also generates synchronization pulses FS to the bus, and also the remaining internal control signals. The control memory CM is conventionally controlled by a microprocessor CP of the type MOTOROLA 6801, not shown in the drawing.

For transmission to the bus, the control memory CM sends addresses to the time slot memory TM on clocking from the time slot counter, so that data can change time slot positions in the TDM system. The address point out the cell in the memory TM from which data is to be read out during the appropriate time slot. The data outputs from the memory TM are connected to the inputs on a latch circuit L1 in the form of a D flipflop of the type 74LS373, in which data is stored for feeding out at the right moment to the inputs on a bus transmitter BS of the type AMD 26LS31. Feeding out data from the latch circuit L1 is done under the control of an internal clock signal CS continuously fed out via the time slot counter TSC. A signal TE (time slot enable) is fed from the control memory CM via the latch circuit to an input of the bus transmitter, thus controlling the feed-out of synchronization pulse and data from the bus transmitter BS to the bus. The oscillator CL delivers a synchronization pulse to the bus once per frame via the time slot counter TSC to synchronize the time slots. The frame synchronization pulse FS is transferred in time slot 0 (zero) to one input on an AND circuit 01, the other input of which obtains the continuously sent internal clock signal from an output of the time slot counter TSC, which is the same signal controlling the feed-out of data from the latch circuit L1. The AND circuit is activated once per frame for sensing the synchronization pulse to be bus transmitter. It is only the module selected as master which delivers synchronization pulses to the bus. Reception of data and synchronization pulses from the bus to the module takes places continuously in a bus receiver BR of the type AMD 26LS32, which sends from its outputs data to the inputs of a further latch circuit L2, a D-flipflop of the type 74LS373. The information is clocked into the latch circuit under control of the internal clock signal CS, which is the same signal clocking out data to the bus, but since the information through the bus is delayed by one time slot the internal clock signal in this case is inverted by an inverting circuit I, the same basic clock signal thus controlling both clocking-out and clocking-in of data respectively to and from the bus. The phase relationship between the clock signals is dependent on the size of the delay through the bus. The latch circuit L2 has outputs connected to inputs on the time slot memory TM. When the information in the latch circuit is to be fed into the time slot memory TM, the latter is controlled by a signal DS (Data Select) from the control memory CM to the latch circuit L2, the clock signals from the time slot counter TSC then serving as pointer for writing in the correct address in the memory.

The frame synchronization pulse FSB sent through the bus is taken from an output on the bus receiver BR and applied to a first input on a phase comparator PC of the type MC 4044. The frame synchronization pulse FSL generated by the local oscillator CL and fed out via the time slot counter is applied to a second input on the phase comparator. The latter thus conventionally makes a comparison between the phase position of the locally generated synchronizing pulse and the synchronizing pulse transmitted through the bus. The comparison result is a voltage U, which is utilized to control the frequency of the clock oscillator CL so that it is always stable. The clock frequency increases and decreases in response to how the relative phase position between the both signals varies, and thereby the resulting voltage U.

Figure 3:
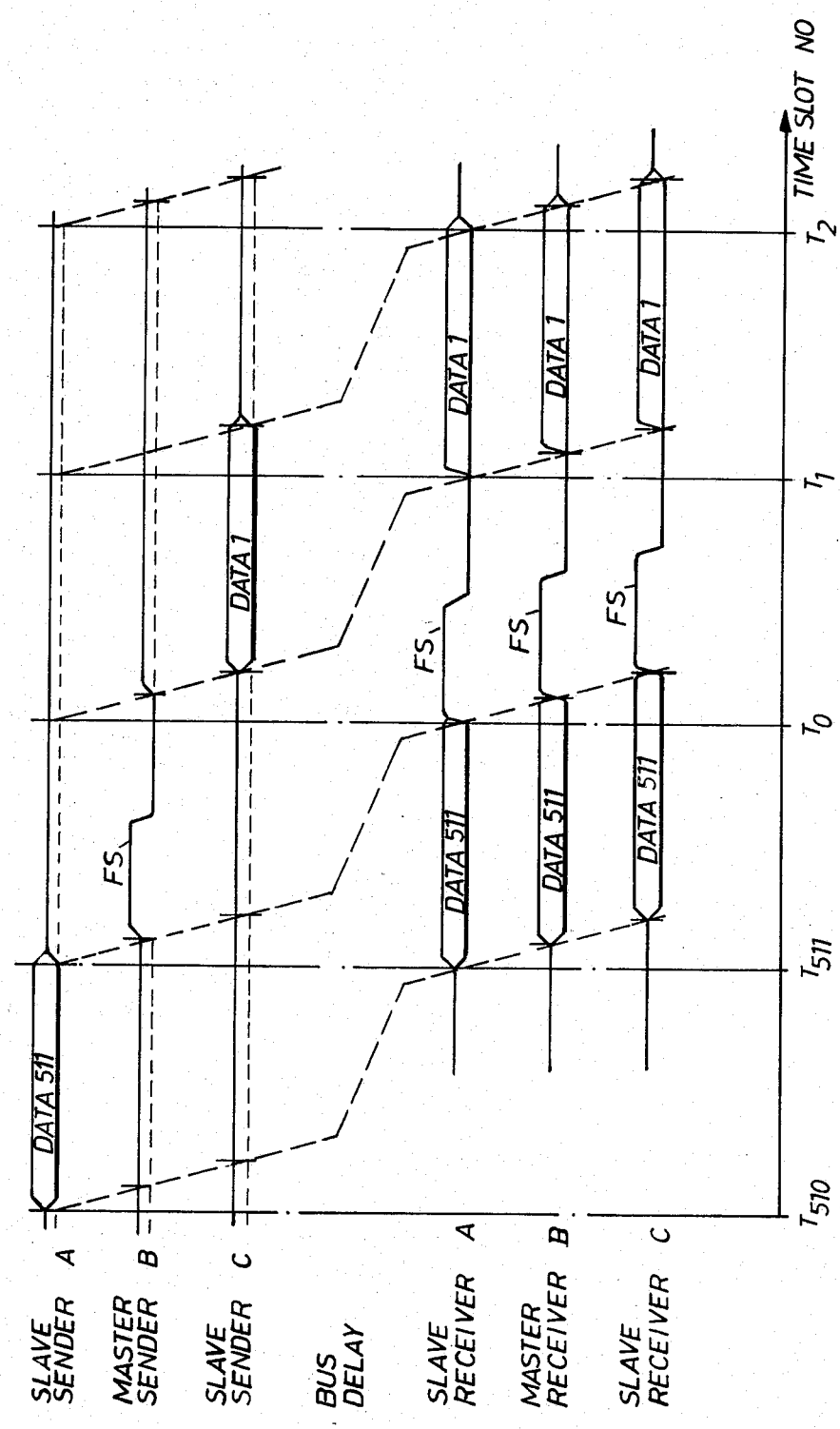
FIG. 3 is a timing chart illustrating how the data information and synchronizing pulses occur in time during transmission through the bus between transmitter and receiver.

FIG. 3 is a timing chart illustrating how a module A transmits in a time slot and receives its own information in the receiver one time slot later. As previously mentioned, the inverted transmitter clock signal should be used for enabling clocking the received information in the middle of the data pulse.

The chart also illustrates how the frame synchronization pulse FS is displaced in time from the transmitter in a master module B through the bus to the receivers A, B and C.

As will be seen in FIG. 3, the slave receiver A receives this frame synchronization pulse and makes a phase comparison with its own local clock. If the phase position is not correct, the phase is controlled so that the synchronization pulse will appear in the middle of its own time slot 0 (zero).

As will further be seen from FIG. 3, the relative phase positions are the same all the time. The delay is one time slot, as will be seen. The instant when the information will start to be transmitted and received in the different modules is dependent on the positions of the transmitters and receivers on the bus. Since all the receivers come after the transmitters with respect to delay, it is thus possible to begin transmission in one time slot before transmitted information from the preceding time slot has been received. This is an advantage which is not possible to achieve, for example, in a ring bus.

There will now be obvious to those skilled in the art many modifications of the above circuit. The modifications will not depart from the scope of the invention if defined by the following claims.

What is claimed is:

1. In a synchronization apparatus in a telecommunication system of the time division multiplex type, in which information is transmitted in assigned time slots in one-way data transmission between a plurality of equal transmitter/receiver modules (A-N) connected to a common bus, for enabling transmission through the bus from arbitrary transmitters (S) to arbitrary receivers (R) in adjacent time slots without time difference between transmission sequences in respective time slots, the improvement in which:

said bus is divided into first, final and intermediate sections; said transmitters (S) being connected in a given order to said first section (B1), each module having a transmitter output and bus input with a predetermined distance therebetween so that a fixed time delay is obtained which is the same for each module, there being a total fixed time delay through said first bus section (B1) dependent on the number of modules (A-N) connected thereto;

said receivers (R) being connected to said final bus section (B3) in the same order as the transmitters, each module having a bus output and receiver output with a predetermined distance therebetween so that a fixed time delay is obtained which is the same for each module, the total fixed time delay through said final section (B3) being dependent on the number of modules (A-N) connected thereto;

said intermediate section (B2) having variable length and extending from the last connected transmitter (S) to the first connected receiver (R), the length of said intermediate section, in relation to the size of said fixed time delays, being adjusted to give a selectable, predetermined total time delay between transmitter and receiver in the same module; each of said modules (A-N) including a clock signal unit (CL) common to the associated transmitter and receiver, said clock signal unit sending, apart from internal clock signals (CS) each time the module is selected as master, a frame synchronization pulse (FS) once per frame to an input of said bus via a bus transmitter (BS), said frame synchronizing pulse (FS) for synchronizing remaining slave modules being sent in parallel with the data in parallel with the data information from the associated transmitter, and a time slot memory (TM) storing data which is written in and read out from and to the bus under control of signals from a control memory (CM) connected to the address inputs of the time slot memory (TM) as well as clock signals, data information being read out to the bus via a first latch circuit (L1) and the bus transmitter (BS), and data being written in to the time slot memory (TM) from the bus via a bus receiver (BR) and a second latch circuit (L2), said read-out and write-in respectively being controlled by signals from the common clock signal unit (CL).

2. Apparatus as claimed in claim 1, wherein said control signals from the clock signal unit (CL) for reading-out and writing-in of information to and from the bus consists of clock signals from the same basic clock signal in a given phase relationship to each other.

3. Apparatus as claimed in claim 1, wherein said first bus section (B1) and said final bus section (B3) are arranged on parallel conductors in the same cable.

4. Apparatus as claimed in claim 1, including and wherein a phase comparator (PC) receives the frame synchronization signal from the bus and compares it with the locally generated frame synchronization pulse, the difference being given as a voltage (U) which corrects the phase position of the clock signal unit.

* * * * *